April 18, 1961   J. B. SNOY   2,979,963
HYDRAULIC CLUTCH CONTROL
Filed Dec. 17, 1957   2 Sheets-Sheet 1
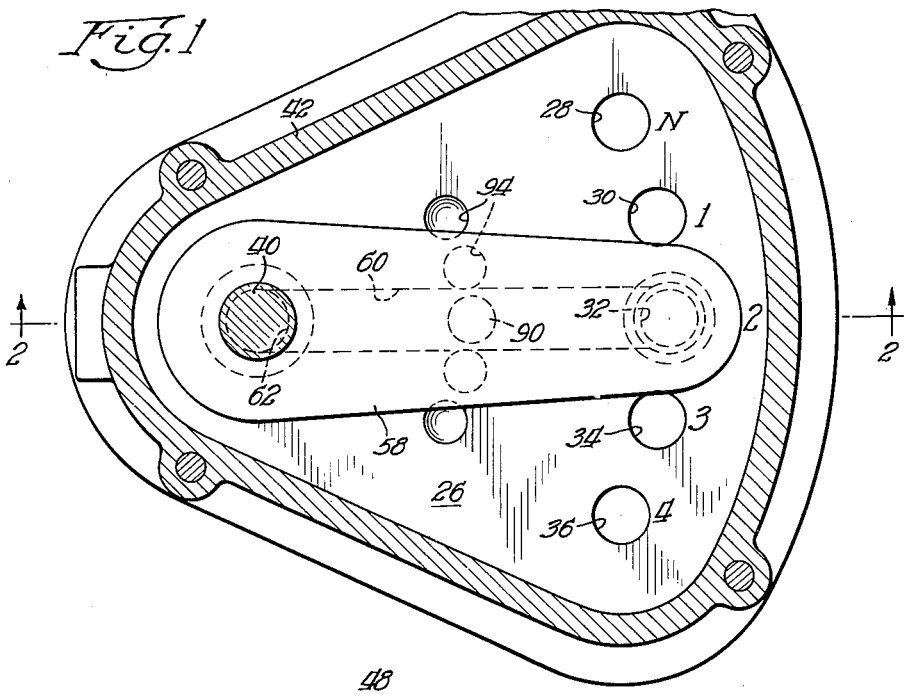
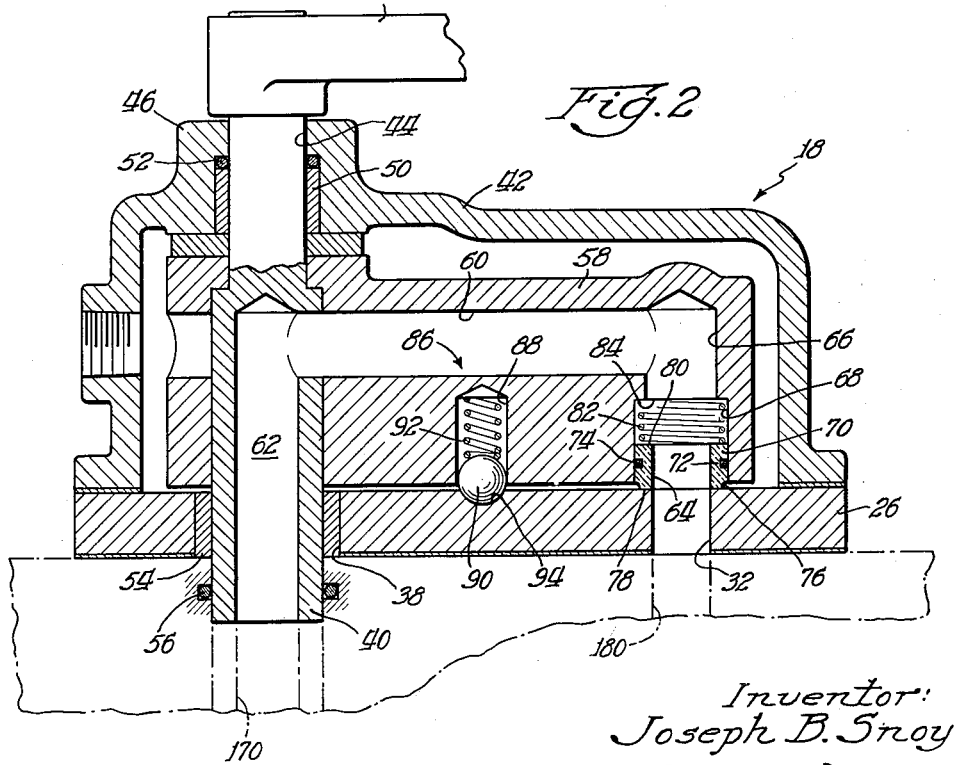
Inventor:
Joseph B. Snoy
By: Francis T. Drumm   Atty April 18, 1961 J. B. SNOY 2,979,963
HYDRAULIC CLUTCH CONTROL
Filed Dec. 17, 1957 2 Sheets-Sheet 2
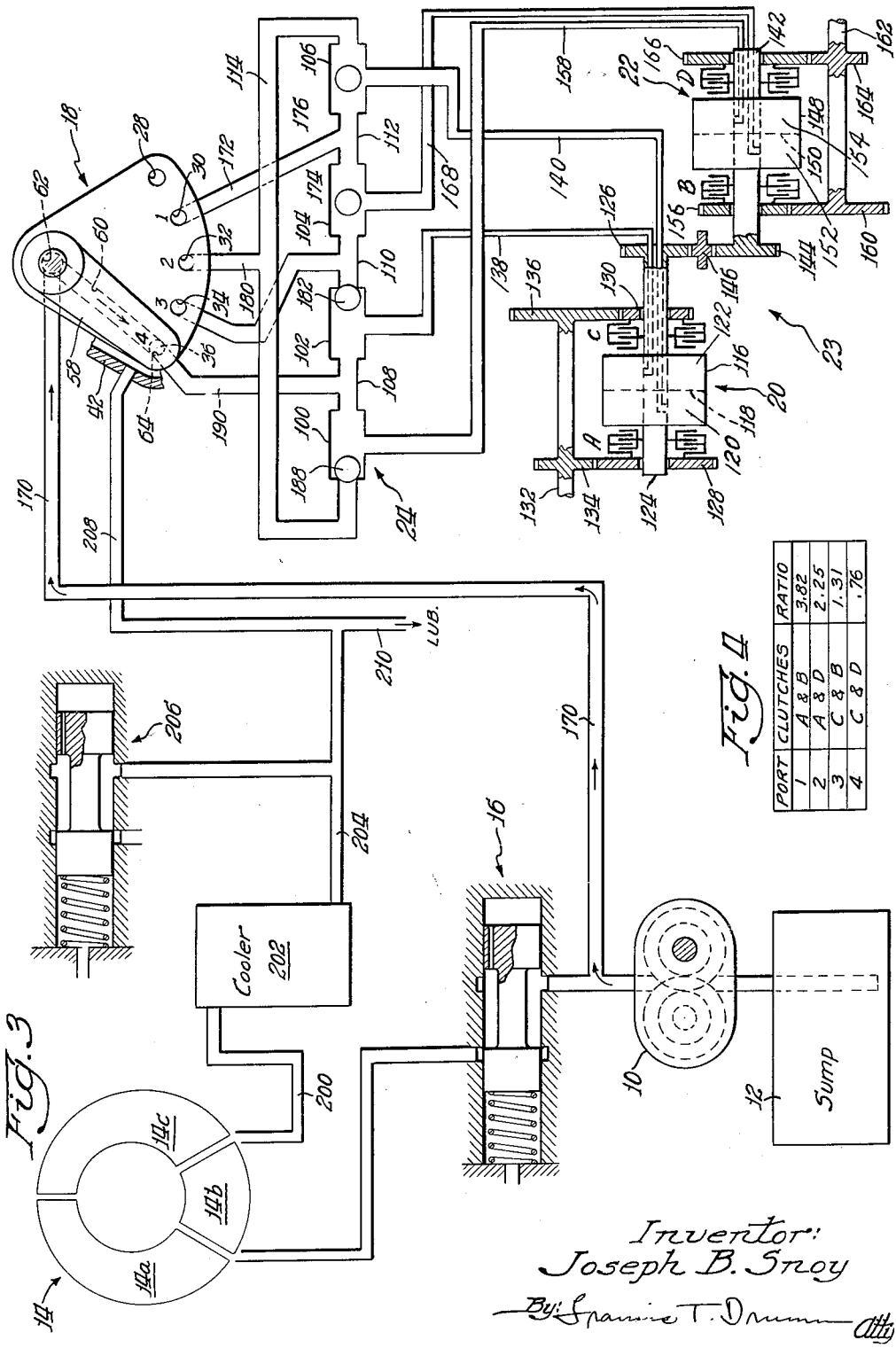
Inventor:
Joseph B. Snoy
By: [signature] Atty United States Patent Office 2,979,963
Patented Apr. 18, 1961

2,979,963
HYDRAULIC CLUTCH CONTROL
Joseph B. Snoy, Rockford, Ill., assignor to Borg-Warner Corporation, Chicago, Ill., a corporation of Illinois
Filed Dec. 17, 1957, Ser. No. 703,361
5 Claims. (Cl. 74—364)

This invention relates to a control for a hydraulic clutch system utilized for selectively connecting gears of a change-speed gear train and more particularly to a hydraulic control apparatus embodying a selector valve of the rotary type.

This invention is primarily directed to a clutch control apparatus having a selector valve for shifting a plurality of double-acting clutch assemblies for transmission of power at a plurality of speed ratios.

A principal object of the invention is, therefore, to provide a hydraulic clutch control having a selector valve for selectively actuating one clutch each of a plurality of change-speed clutch assemblies which is characterized by efficiency and effectiveness in operation and which requires only simple machining operations, nominal tolerances, minimum space and a minimum number of parts.

A further object of the invention is to provide a hydraulic clutch control having a selector valve of the rotary type in which means are provided for effectively precluding bypassing of the pressure fluid during its course of flow to the valve outlet.

Another object of the invention is to provide a hydraulic clutch control apparatus having a selector valve provided with a plurality of outlets and having means for maintaining the unselected outlets at a predetermined pressure to assure instantaneous actuation.

A further object of the invention is to provide a hydraulic control of the stated type in which the selector valve is in fluid communication with a distribution assembly capable of directing fluid to one clutch each of a plurality of change-speed clutch assemblies.

These and other objects and features of the invention will be apparent from the specification when taken with the accompanying drawings, in which:

Figure 1 is a selectional plan view of a selector valve forming a part of the hydraulic control apparatus of the present invention;

Figure 2 is an elevational sectional view taken substantially on line 2—2 of Figure 1;

Figure 3 is a schematic view of a hydraulic clutch control system made in accordance with the present invention; and Figure 4 is a chart showing the clutches which are engaged in the several positions of the selector valve.

Referring now to the drawings and more particular to Figure 3 the hydraulic clutch control system of the present invention includes generally a pump 10 for forcing hydraulic fluid from a sump 12 to a hydraulic torque converter 14 through a regulating valve 16, which reduces the fluid pressure to a predetermined lower level, and a selector valve 18 for directing hydraulic fluid at pump outlet pressure to selected pairs of clutches of double-acting clutch assemblies 20 and 22 forming a part of a change-speed gear train 23. Each clutch of the clutch assembly 20 may be engaged simultaneously with one or the other of the clutches of the clutch assembly 22 to obtain four different speed ratios by means of a fluid distribution system 24 interposed between the selector valve 18 and the clutch assemblies 20 and 22.

The selector valve 18 is shown in detail in Figures 1 and 2 and includes a base plate 26 having a plurality of arcuately arranged outlet ports 28, 30, 32, 34 and 36 corresponding to a neutral position and first, second, third and fourth speeds forward positions respectively. The base plate 26 is provided with an opening 38 for reception of a hollow shaft 40 which passes into the interior of a housing or casing 42, secured to the base plate 26, and thence outwardly through an opening 44 formed in a hub 46 in the casing. The shaft 40 may be rotated manually by a handle 48 which may be suitably keyed to the upper end of the shaft, as viewed in Figure 2. The shaft 40 may be journaled at the upper end by means of a bushing 50 and sealed by an O ring 52. Similarly, the lower end of the shaft 40 may be journaled in a bushing 54 and sealed by an O ring 56.

A selector arm 58 is shown as suitably keyed to shaft 40 so as to rotate therewith. An elongated passage 60 is formed in the arm 58 and communicates with a bore 62 in the shaft 40, which forms an inlet for the hydraulic fluid into the valve 18, and at the other end with an outlet 64. The arm 58 may be rotated manually by the handle 48 so that the selector outlet 64 is in register selectively with either the outlet ports 28, 30, 32, 34 or 36.

The clutch assembly 20 includes a clutch A and a clutch C, while the clutch assembly 22 includes a clutch B and a clutch D. Either of the clutches A or C may be engaged simultaneously with either of the clutches B or D when the selector arm 58 is in a particular position, as will be hereafter apparent.

According to the present invention means are provided to preclude bypassing of pressure fluid into the interior of the casing 42. To this end, the outlet 64 is shown formed with a bore 66 and a counter bore 68 in which is mounted a seal 70 of Telflon, bronze or the like, and provided with a peripheral groove 72 for reception of an O ring 74 for sealing purposes. The lower edge of the sleeve 70 is relieved at 76 to present an annular confronting face 78 to the adjacent surface of base plate 26 of substantially less area than top surface 80 which is engaged by one end of a compression spring 82, the other end of which rests in abutment with a shoulder 84 formed at the juncture of the bore 66 and the counterbore 68. By this arrangement, the pressure exerted by the spring 82 is augmented by the fluid pressure acting on the top surface 80, and, the pressure per unit area on surface 78 is substantially greater than would be possible in the absence of the relieved portion 76. Consequently, the efficiency of the sealing effect of the sleeve 70 is greatly enhanced.

To retain the selector arm 58 in one of the five finite positions illustrated, a detent assembly 86 is formed in the arm 58 and includes a bore 88 and a ball 90 normally urged downwardly, as viewed in Figure 2, by a compression spring 92. The base plate 26 is provided with a plurality of arcuately spaced recesses 94, for selective reception of the ball 90, corresponding to the several outlet ports and respectively in radial alignment therewith. It will be apparent that the selector arm 58 may be indexed in any one of the several positions illustrated for registration of the outlet 64 with either of the outlet bores 28, 30, 32, 34 or 36.

According to an important aspect of the present invention, the selector arm 58 may be moved so that the outlet 64 is in register with either one of the ports 30, 32, 34, or 36 to obtain a progressively higher speed ratio in that order. The manner in which this is accomplished will now be described with particular reference to the distribution assembly 24, in Figure 3. The distribution assembly 24 is illustrated schematically in that figure it being understood that this assembly may be formed integrally with the selector valve 18, if desired. The distribution assembly 24 is shown as including a plurality of hollow cylinders 100, 102, 104, and 106. Interconnecting the adjacent cylinders are passages 108, 110, and 112 respectively. A manifold 114 affords communication between the cylinder 100 and the cylinder 106. Fluid is fed into one or the other of the cylinders 100, 102, 104 and 106 for distribution to one or the other of the clutches A or C, and, simultaneously, to one or the other of the clutches B or D. The manner of distribution of the fluid for particular speed ratios is hereinafter described.

The clutch assembly 20 is preferably constructed in accordance with the teaching of Patent No. 2,868,341, Joseph B. Snoy, entitled Double Acting Clutch. The assembly 20 functions selectively to afford engagement of the clutch A or the clutch C in a manner set forth in the aforementioned application and is schematically illustrated in Figure 3 of the drawings. This assembly 20 includes a hollow cylinder 116 divided by a fixed reaction plate 118 into a first compartment 120 and a second compartment 122. The compartments 120 and 122 when pressurized, form clutch operators in a manner hereafter described. The reaction plate 118 is secured to an elongated axially fixed shaft 124 to one end of which is affixed a gear 126. Clutch A is of conventional type and has discs connected to the shaft 124 and other interleaved discs fixed to a gear 128, while clutch C of similar construction, is operative upon actuation to connect the shaft 124 and a gear 130. The clutches A and C may be selectively engaged by selective pressurization of chambers 120 or 122 for movement of the cylinder 16 into engagement therewith. Reference numeral 132 indicates an input shaft having affixed thereto a gear 134 in mesh with the gear 128 and a gear 136 in mesh with the gear 130. With clutch A engaged, and assuming rotation of the shaft 132 in a clockwise direction, as viewed from the left in Figure 3, the gear 134 is drivingly connected to the gear 128 for rotation of the shaft 124 and the gear 126 in the opposite direction at a predetermined reduced speed. The means for pressurization of the chambers 120 and 122 will be hereinafter described in detail. Fluid may be supplied to the chamber 120 through the conduit 140 in a manner hereinafter described.

Clutch C may be engaged by introducing hydraulic fluid through a conduit 138, in a manner hereinafter described, into the chamber 122 for movement of the cylinder 116 to the right, as viewed in Figure 3, so that the gear 136 and the gear 130 are drivingly connected and so that the shaft 124 and the gear 126 are rotated in the opposite direction of rotation of the shaft 132 at a predetermined higher speed.

The clutch assembly 22 includes an elongated shaft 142 having affixed thereto a gear 144 which is operatively connected to the gear 126, by means of an idler gear 146 for rotation in the same direction as the shaft 124. A hollow cylinder 148 is divided by a reaction plate 150 into a first chamber 152 and a second chamber 154. Clutch B is similar in construction to clutches A and C and is connected to a gear 156. The gear 156 may be drivingly connected to the shaft 142 by introducing hydraulic fluid into the chamber 152 through a conduit 168 in a manner hereinafter described. The gear 156 is normally in mesh with a gear 160 affixed to an output shaft 162 to the other end of which is affixed a gear 164. The gear 164 is normally meshed with a gear 166 to which is connected the clutch D similar to clutches A, B and C. The clutch D may be actuated by the introduction of the hydraulic fluid into the chamber 154 through a conduit 158 in a manner hereinafter apparent.

It will be appreciated that the difference in speed between the output shaft 162 and the input shaft 132 is determined by the speeds of rotation of the shafts 124 and 142. These shaft speeds, in turn, are determined by which of the several clutches are engaged at a particular time.

Operation of the selector valve 18 and the distribution assembly 24, according to the present invention, affords selective actuation of one or the other of the clutches of clutch assembly 20 simultaneously with actuation of one or the other of the clutches of clutch assembly 22.

Assuming that the selector arm 58 is moved from the neutral position to the position in which the outlet 64 of the selector arm is in register with the outlet port 30 which corresponds with the first speed forward, hydraulic fluid at pump outlet pressure is fed through a conduit 170 to the bore 62 forming the inlet for the selector valve 18. The fluid then flows through the elongated passage 60, the selector arm outlet 64, the outlet port 30, and thence through a conduit 172 to the passage 112. A check ball 174 is arranged in the cylinder 104 while a check ball 176 is arranged in the cylinder 106. Fluid under pressure from the passage 112 moves the check ball 174 to the left, thus obstructing the passage 110 and permitting the flow of fluid through the conduit 168 to the chamber 152 of the clutch assembly 22 for movement of the cylinder 148 to the left and for effecting engagement of the clutch B. At the same time, the check ball 176 is moved to the right, thus obstructing the manifold 114 and permitting the flow of fluid through the conduit 140 to the chamber 120 for actuation of the cylinder 116 to the left and for effecting actuation of the clutch A. By this arrangement, torque may be transmitted by the gear 134 to the gears 128, 126, 146, 144, 156, and 160 to the output shaft 162.

The operation of the control apparatus of the present invention at the second speed ratio will now be described. The selector arm 58 is moved from the position corresponding to the first speed ratio to a position in which the outlet 64 thereof is in register with the outlet port 32 so that hydraulic fluid may flow at pump outlet pressure through a conduit 180 to the passage 114. Check ball 188 is disposed within the cylinder 102 and is urged to the right to obstruct the passage 108. At the same time, the check ball 176 is moved to the left to obstruct the passage 112. The hydraulic fluid is then free to flow through the conduit 140 to the chamber 120 for actuation of the clutch A in the manner described, and to flow through the conduit 158 into the chamber 154 for actuation of the clutch D. In this speed position, the clutch assembly 20 is operated in the same manner as in the first speed position. The actuation of the clutch D affords a driving connection between the gear 166 and the gear 164 so that the output shaft 162 rotates at a predetermined higher speed and the gear 156 becomes an idler.

To operate the control apparatus of the present invention in the third speed forward position, the selector arm 58 is moved from the second speed forward position to a position in which the outlet 64 thereof is in register with the outlet port 34 of the base plate 26 so that fluid under pressure flows from the selector valve 18 through a conduit 186 to the passage 110. This fluid pressure urges a check ball 182, which is disposed within the cylinder 102, to the left to obstruct the manifold 108. The check ball 174 is urged to the right to obstruct the passage 112 and fluid is forced through the conduit 168 into the chamber 152 for actuation of the clutch B in the manner described above and through the conduit 138 into the chamber 122 for actuation of the clutch C. In this position of the selector arm 58, power is transmitted from the input shaft 132 to the gears 136, 130, 126, 146, 144, 156, and 160 to the output shaft 162.

For the fourth speed forward position the selector arm 58 is moved to cover the port 36 and fluid under pressure is fed through a conduit 190 to the manifold 108 and the cylinder 100. The check ball 188 is moved to a position obstructing the passage 114 and fluid under pressure is delivered through the conduit 158 to the chamber 154 for actuation of clutch D in the manner described above. Simultaneous with this flow of fluid, fluid is fed into the cylinder 102 to urge the check ball 182 to a position obstructing the manifold 110 to permit the passage of fluid into the conduit 138 to the chamber 122 for actuation of clutch C. In this position of the selector arm 58, power is transmitted from the input shaft 132 through the gears 136, 130, 126, 146, 144, 166, and 164 to the output shaft 162.

The convertor 14 is shown as comprising an impeller 14a, a stator 14b and a turbine 14c. Fluid flows from the convertor 14 by means of a conduit 200 to a cooler 202 and thence to a conduit 204. The pressure of the outlet fluid is regulated to approximately 10 p.s.i. by means of a pressure regulator 206. This low pressure fluid may be fed, by means of a conduit 208, to the interior of the casing 42 to maintain this space at a predetermined pressure so that the conduits connected to the several unselected outlet ports are maintained at a sufficient pressure level that instantaneous operation of the clutches is assured once a particular outlet is selected. A branch line 210 at reduced pressure may be provided for purposes of lubrication.

The above described control system is characterized by ease and facility of operation, as well as reliability under conditions of continued use. The four speed forward arrangement is illustrative in nature, it being understood that any number, within limits of course, of forward speed and reverse speed ratios may be obtained by providing a selector valve having the required number of outlet ports. The selector valve illustrated is particularly suitable for use with a mechanical cycle selector (not shown) in installations where forward and reverse speeds are utilized and where it is desirable to limit the operation of a mechanism, such as a front loading power shovel, road grader or the like, to only forward and reverse motions at particular forward and reverse speeds. The mechanical cycle selector may take the form of a limit stop for the selector arm of the type illustrated in Figure 3. By the present invention, a plurality of forward speeds are made possible by the simple manipulation of the selector valve which actuates the distribution assembly to obtain, in the present instance, simultaneous operation of one clutch of one clutch assembly with one or the other clutch of the other clutch assembly. Simultaneous operation of the clutches is assured by the provision of the pressurized chamber formed by the casing 42. By this arrangement, instantaneous supply of fluid to the several clutches is assured.

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. In a control apparatus for a change-speed gear train having a plurality of clutch assemblies each of which includes a pair of clutches and a pump for supplying pressure fluid to said clutch assemblies, the improvement comprising selector means for directing the pressure fluid simultaneously to a clutch operator of one clutch of each assembly to effect a plurality of speed ratios, said means including a selector valve having an inlet and a plurality of outlets, a selector arm selectively movable into register with said outlets and a distribution assembly operable in response to fluid pressure to direct the fluid to certain of said clutch operators for engagement of certain of said clutches.

2. In a control apparatus for a change-speed gear train having a plurality of clutch assemblies each of which includes a pair of clutches, and a pump for supplying pressure fluid to said clutch assemblies, the improvement comprising selector means for directing the pressure fluid simultaneously to a clutch operator of one clutch of each assembly to effect a plurality of speed ratios, said means including a selector valve having an inlet and a plurality of outlets, a selector arm selectively movable into register with said outlets, and a distribution assembly operable in response to fluid pressure to direct the fluid to certain of said clutch operators for engagement of certain of said clutches, said distributor assembly including a plurality of hollow cylinders, means affording fluid communication between said outlets and a pair of said cylinders, each of said cylinders being in fluid communication with a plurality of clutch operators, whereby certain of said clutches are engaged when said selector arm is moved into register with a particular outlet and a predetermined speed ratio is attained.

3. In a control apparatus for a change-speed gear train having a plurality of clutch assemblies each of which including a pair of clutches each actuatable by a clutch operator having an hydraulic cylinder, said cylinder being divided into a pair of compartments by a fixed reaction plate, the improvement comprising selector means for effecting simultaneous engagement of one clutch of each pair, said selector means comprising a selector valve having an inlet in communication with a source of fluid under pressure, a plurality of outlets, means for selectively connecting said inlets with said outlets, and a distribution assembly having a plurality of hollow interconnected cylinders, a check ball in each of said hollow cylinders, means affording fluid communications between one of said outlets and a particular pair of said interconnected cylinders, said check balls being operative to preclude passage of fluid into others of said hollow cylinders, means affording fluid communication between each of said hollow cylinders and one compartment of each hydraulic cylinder for actuation of said plunger in one direction or the other to engage one clutch or the other of each clutch assembly.

4. A control apparatus for a gear train operated by a plurality of double-acting hydraulic clutches comprising a source of fluid pressure, clutch operator means, selector means for selectively directing fluid to said clutch operator means for actuation of each of said clutches in one direction or the other, said selector means including a selector valve having a casing provided with an inlet and a plurality of outlets, means selectively connecting said inlet with one or the other of said outlets, conduit means connecting said valve outlets to said clutches, and means for maintaining a predetermined pressure in said conduits whereby said clutches are immediately actuatable upon movement of said means connecting said inlet with said outlets to a position in register with one of said outlets.

5. Apparatus for controlling the operation of a power transmission having a plurality of double-acting clutches for effecting gear speed changes, each of said clutches having a clutch operator; comprising a source of pressure fluid, a pump, pressure reducing means in fluid communication with the outlet of said pump, a selector valve having a casing provided with an inlet and a plurality of outlets, said valve including a selector arm movable to connect said inlet with one or the other of said outlets, a conduit connecting the outlet of said pump with the inlet of said valve, a conduit connecting said pressure reducing means with the interior of said casing whereby a predetermined low pressure is maintained in said casing interior, and conduit means providing fluid communication between said valve outlets and the several clutch operators whereby a predetermined fluid pressure is maintained in the conduit means communicating with the unselected outlets and instantaneous actuation of the clutches is afforded.

References Cited in the file of this patent

UNITED STATES PATENTS

| | | |
|---|---|---|
| 2,028,152 | Gray | Jan. 21, 1936 |
| 2,521,119 | Green | Sept. 5, 1950 |
| 2,521,779 | Davidson | Sept. 12, 1950 |
| 2,593,733 | Davies | Apr. 22, 1952 |
| 2,780,334 | Simmons | Feb. 5, 1957 |